United States Patent

[11] 3,592,549

[72] Inventor Robert Hoffman
 12 Copper Beech Place, Merrick, N.Y. 11566
[21] Appl. No. 825,704
[22] Filed May 19, 1969
[45] Patented July 13, 1971

[54] INTENSITY-MEASURING APPARATUS USING POLARIZATION INTERFEROMETRY
 5 Claims, 4 Drawing Figs.
[52] U.S. Cl. ................................................. 356/110, 350/14
[51] Int. Cl. ................................................. G01b 9/02, G02b 21/06
[50] Field of Search ........................................... 350/12, 158; 356/106—113, 114—118

[56] References Cited
UNITED STATES PATENTS
2,601,175  6/1952  Smith ......................... 350/12

Primary Examiner—Ronald L. Wibert
Assistant Examiner—Conrad Clark
Attorney—Kenneth S. Goldfarb ABSTRACT: An optical system for precision angular measurement using polarization interferometry comprising a light source, a specimen, and a focusing system for directing light rays. Adjustable spaced birefringent elements are provided for splitting and displacing light rays from the focusing system and for receiving light rays from the specimen. An analyzer is provided for causing light rays from each of the spaced birefringent elements to interfere, and detectors and provided for measuring the relative light intensity of each of the interfering light rays.

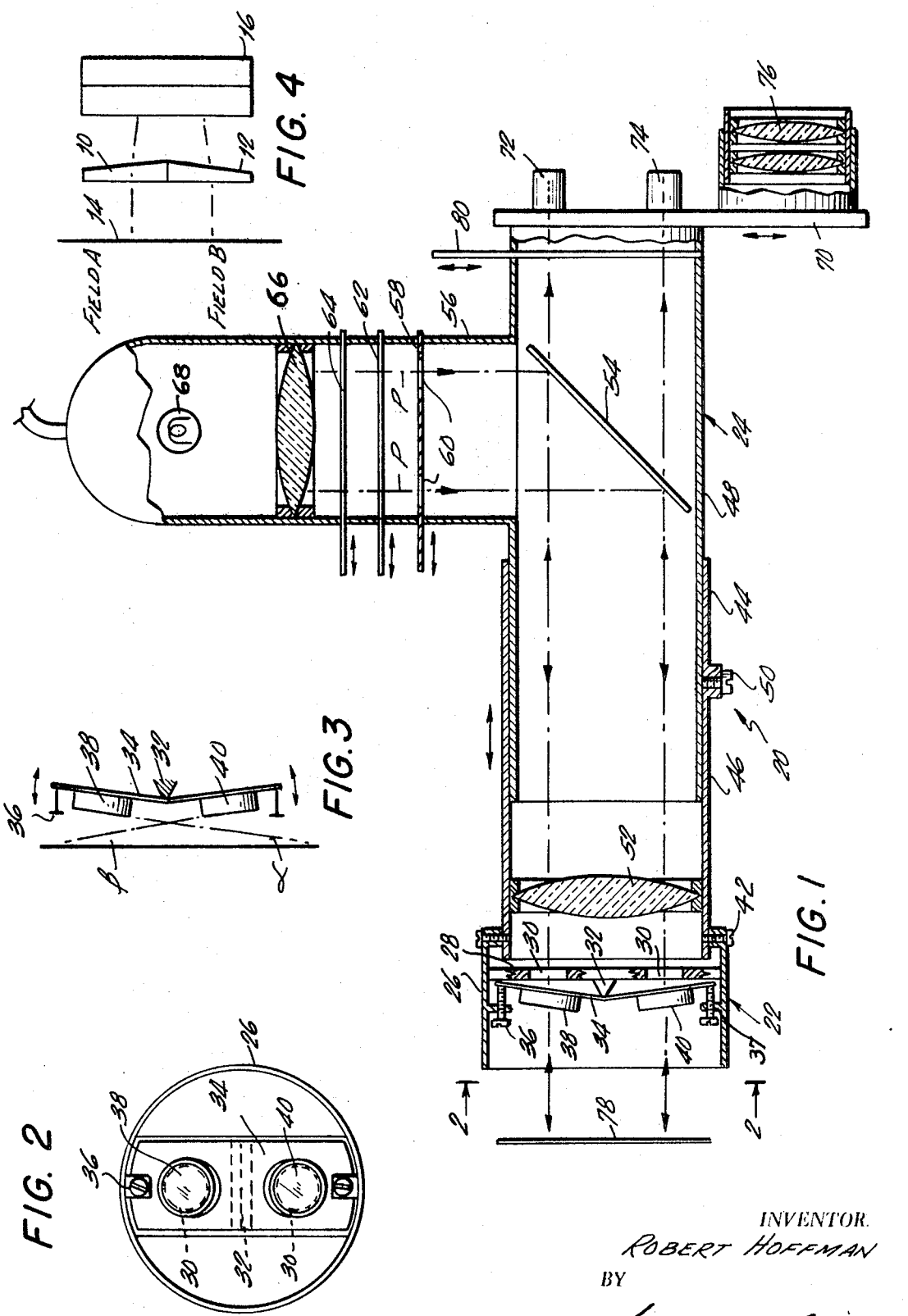

INTENSITY-MEASURING APPARATUS USING POLARIZATION INTERFEROMETRY

This application is a continuation in-part of application Ser. No. 712,011 filed Mar. 11, 1968.

This invention relates to an optical instrument for precision angular measurement using polarization interferometry.

In the copending application of Robert Hoffman, Ser. No. 712,011, filed Mar. 11, 1968 for Detecting and Measuring Apparatus Using Polarization Interferometry, there is disclosed an optical device for detecting and providing an accurate measure of the optical path difference between two points on a specimen. The present invention provides for an optical instrument which utilizes the theorem that interference of light can be represented by a $Sin^2$ function to provide for accurate and precise angular measurement of a specimen or work object.

This same function represents differential interference using birefringent elements according to the following formula:

$$I = Sin^2 \pi \Delta/\lambda$$

where $I$ = intensity when $\Delta/\lambda = \frac{1}{2}$, $I$ = maxima
$\Delta$ = path difference where $\Delta = 0$, $I$ = minimum
$\lambda$ = wave length The interference caused by a Savart polariscope, for example, follows the above formula. In the differential system $$\Delta = 2 di$$

where $d$ + lateral image displacement in microns
$i$ = angle (radian) between Savart and reflecting surface Thusly, the interference of light caused by a Savart polariscope is represented by the formula:

$$I = \sin^2 \pi \frac{2di}{\lambda}$$

In an instrument for measuring intensity, a reference signal is necessary against which a test signal can be compared. Since absolute light stability is impossible, a reference signal must be established that is fixed for the instrument. This is carried out by an object of this invention in providing for a push-pull system that establishes the reference signal from the test signals.

It is a further object of this invention to provide an optical instrument employing a push-pull optical system for precision angular measurement.

Another object of the invention is to provide a sophisticated precision measuring instrument for determining angular position of various specimens for use in testing and recording to extreme accuracy various other mechanisms, instruments and devices where such exactness is necessary.

Still further objects and features of this invention reside in the provision of an optical instrument which is adjustable for testing a wide range of work objects and specimens, is itself adjustable for accurate measurement of work objects and test specimens located at various distances from the instrument as is necessary in some installations, and which is resistant because of its push-pull optical system to such accidental damage as would render the instrument inoperable for its functions as often occurs in other sophisticated instruments.

These, together with the various ancillary objects and features of the invention, which will become apparent as the following description proceeds, are attained by this intensity measuring apparatus using polarization interferometry, a preferred embodiment of which is illustrated in the accompanying drawing, by way of example only, wherein:

FIG. 1 is a longitudinal sectional view of an embodiment of the invention;

FIG. 2 is an elevational view looking in the direction of the plane of line 2-2 in FIG. 1;

FIG. 3 is a schematic view of the birefringent elements used in the embodiment of the invention; and, FIG. 4 is a schematic view of a simplified birefringent assembly used to illustrate the concepts of the present invention.

With continuing reference to the accompanying drawing, wherein like reference numerals designate similar parts throughout the various views, and with initial attention directed to FIG. 4, it will be seen that two wedges 10 and 12 are cut and arranged back to back so that light reflected normal from a reflecting surface 14 of a specimen or work object having Field A and Field B passes through each of the wedges 10 and 12 at an angle predetermined to result in 50 percent intensity ($I_{50}$). When these wedges are placed in front of the Savart birefringent element 16 the intensity of each field reflected through each wedge is at 0.5 intensity or at the inflection point of the sine curve which is the point of greatest sensitivity and linearity.

If the light leaves the reflecting surface 14 at some angle other than a right angle, then the angle of light that exits one wedge is increased while the angle of light that exits the other wedge decreases. Thus, for a tilt of the reflecting surface an optical push-pull system is developed where the change of intensity in each field is equal and in opposite directions from the inflection point achieving equal + and − excursion from the inflection point. The sum of the (1) intensity of each field is constant for a given light flux. Since all intensity readings are percentages of the total light flux, there is a constant proportion between any angle and the inflection point. Thus, $I_b/I_{50}$ and $I_A/I_{50}$ is constant for an angle and any light flux where $I_B$ and $I_A$ are the intensities of the respective field.

If the light flux varies, so will $I_{50}$, $I_A$, $I_B$, but $I_A$ and $I_B$ will remain in the same proportion to $I_{50}$. As the angle of reflection changes, $I_A$ and $I_B$ change but $I_{50}$ remains constant. The proportional change is then a measure of angular change.

The optical components necessary for this push-pull system is hereinafter. Several different arrangements of mirrors and Savart polariscopes can also be arranged to give a push-pull system. The common principal is that for angle change one field increases while the other decreases by an equal amount since at zero angle each field is set for the inflection point of the Savart.

Referring now to FIG. 1, an optical instrument for precision angular measurement constructed in accordance with the concepts of this invention is generally designated by reference numeral 20 and includes a differential interference assembly 22 and an optical imaging assembly 24. The differential interference assembly includes a cylindrical housing 26 with a metal face plate 28 having two apertures 30 therethrough. Mounted on face plate 28 is a fulcrum 32 on which spring steel plate 34 is adjustably mounted and pivoted by adjusting tension screw 36 threaded in detent 37 depending from housing 26.

Spring steel plate 34 has apertures in alignment with apertures 30. Mounted on spring steel plate 34 in its apertures are birefringent image-splitting plates (Savart plates) 38 and 40. Threaded fastener 42 is provided to permit the interference assembly 22 to be removably attached to the optical imaging assembly 24 for changing angular range of the instrument 20.

Optical imaging assembly 24 comprises a telescoping cylindrical casing 44 having sections 46 and 48 which are relatively adjustable for focusing. Screw 50 locks the position of sections 46 and 48. A lens system 52 is mounted within section 46. Section 48 has mounted therein a semireflecting element 54 which passes light in one direction and reflected light in the other direction. A vertical illumination assembly tube 56 communicates with section 48 and comprises a field diaphragm 58 with apertures 60 for double fields, aperture diaphragm 62, polarizer 64, condensing lens system 66, and illuminating lamp 68. The field diaphragm 58, aperture diaphragm 62, and polarizer 64 are arranged to slide in and out of light paths P. At the image end of section 48 and slidably mounted thereon is an image plane slide plate 70 comprising two photo electric detectors 72 and 74 and eyepiece 76. Mirror 78 is the test surface at some distance from the optical instrument 20. Analyzer 80 is crossed with polarizer 64.

The instrument 20 is set for push-pull action by adjusting screw 36 which creates angle $\alpha$, see FIG. 3, for Savart element 40 and angle B for the other Savart element 38.

Angle $\alpha=B$ and these angles are at the inflection point of the intensity distribution curve of Savart element 38 and 40 whose function is represented by the expression $I=\sin^2 \pi\Delta i\lambda$ where $\Delta=2\,di$ and where $d=$ lateral image displacement of Savart element in microns.

$i=$ the angle between element 38 and mirror 78 (radians)

$\lambda=$ length in microns. As the mirror 78 is moved to some angle not equal to 90° to the optical axis, the intensity of the light beams P change. The beam reaching photo detector 72, for instance, may increase while the light reaching 74 decreases. Instead of two Savart elements, one Savart may be used in FIG. 4 with a glass wedge so that the light rays are bent so that when M is 90° to the optical axis the rays enter the Savart element at angle $\alpha=B$ which are the angles necessary for the inflection point of the function of the Savart element. By adding another differential interference assembly at right angle to the assembly 22 and by adding 2 more photo detectors, X-Y rotation can be detected.

In use, differential light intensity is measured and based on calculations from the foregoing formulas the angular inclination or disposition of the workpiece can be determined. This is highly desirable for sophisticated instrumentation and installations for many diversified purposes including astronomical installations, ballistic control, manufacturing processes, and electronic devices.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

I claim:

1. An optical system for precision angular measurement using polarization interferometry comprising a polarized light source for providing two spatially separate beams, a focusing system for directing said beams from said source through said system and to a specimen, birefringent means including a pair of birefringent elements angularly disposed with respect to each other, each of said beams passing through one of said angularly disposed birefringent elements and onto said specimen, said beams being reflected from said specimen through said birefringent elements at an angle depending upon the orientation of said specimen, means for angularly adjusting the position of said birefringent means with respect to said specimen, analyzer means for causing light rays of each of said beams from said birefringent means to interfere, and detection means for measuring the relative light intensity of said interfering light rays.

2. An optical system according to claim 1, including a plate having angulated portions provided with apertures therethrough, said birefringent elements being disposed in said apertures.

3. An optical system according to clam 2, including a housing, and means angularly adjustably mounting said plate in said housing.

4. An optical system according to claim 1, wherein said adjusting means includes a telescopic casing in which said focusing system and said analyzer means are disposed.

5. An optical system for precision angular measurement using polarization interferometry comprising a polarized light source for providing two spatially separate beams, a focusing system for directing said beams from said source through said system and to a specimen, birefringent means, double wedge means for adjusting the angle of the light beams passing through the birefringent means and onto said specimen, said beams being reflected from said specimen through said birefringent means at an angle depending upon the orientation of said specimen, means for angularly adjusting the position of said wedge means with respect to said specimen, analyzer means for causing light rays of each of said beams from said birefringent means to interfere, and detection means for measuring the relative light intensity of said interfering light rays.